Dec. 28, 1943.  J. F. ATKINSON  2,337,962
METHOD AND APPARATUS FOR DETERMINING RESISTANCE OF GROUND CONNECTIONS
Filed Aug. 4, 1940
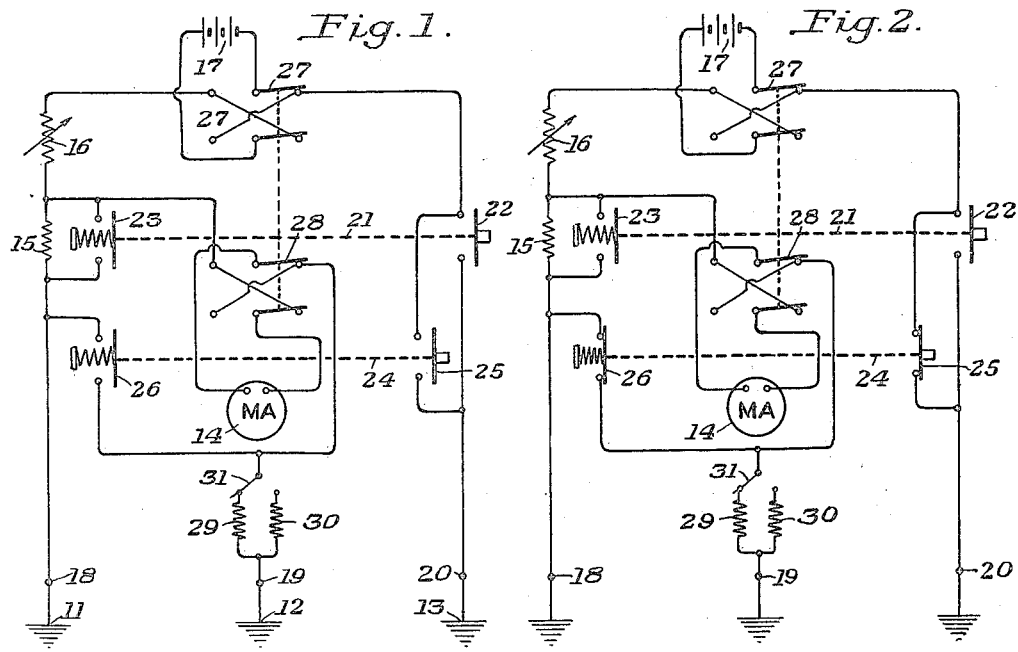
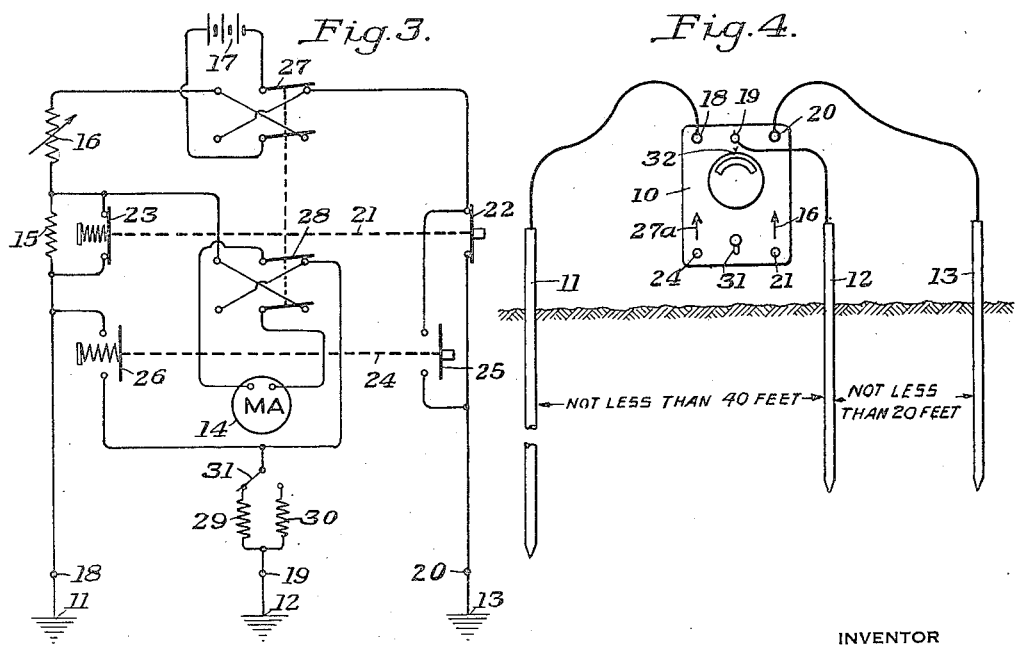
INVENTOR
John F. Atkinson
by his attorneys
Stebbins and Blenko Patented Dec. 28, 1943

2,337,962

UNITED STATES PATENT OFFICE 2,337,962

METHOD AND APPARATUS FOR DETERMINING RESISTANCE OF GROUND CONNECTIONS

John F. Atkinson, Washington, D. C., assignor to Copperweld Steel Company, Glassport, Pa., a corporation of Pennsylvania Application August 4, 1940, Serial No. 351,338

1 Claim. (Cl. 175—183)

This invention relates to the measurement of the resistance of ground connections and, particularly, to a method of measurement and an apparatus therefor adapted to field use.

In numerous electrical installations, it is necessary to make sure that the resistance of a ground connection is not higher than a desired value. There is a demand, therefore, for a simple, inexpensive and readily portable device for measuring the resistance of ground connections. It is the object of the present invention to provide such a device which can be manufactured at relatively low cost and is effective to measure the resistance of ground connections with sufficient accuracy for all practical purposes. In a preferred embodiment of the invention, I provide a portable case containing a current source such as a battery, a meter adapted to serve both as an ammeter and a voltmeter, and the control devices necessary to establish the circuits in proper order, to obtain a reading of the resistance. The invention measures the resistance of a ground connection by determining the voltage drop across the ground when a predetermined current is flowing therethrough. The procedure is to establish a predetermined current flow through the ground, connecting the meter to read as an ammeter, and then changing connections by means of the control devices, so that the meter reads as a voltmeter to show the voltage drop across the ground being measured.

The following detailed description of the embodiment and practice briefly outlined above refers to the accompanying drawing. In the drawing, Fig. 1 is a circuit diagram showing the condition of the apparatus when not in use;

Fig. 2 is a view showing the same circuit with the parts in position for establishing a predetermined current flow through the ground being measured;

Fig. 3 is a view similar to Fig. 1 showing the parts in position for determining the voltage drop across the ground; and Fig. 4 is a diagrammatic view illustrating the arrangement of the ground being tested and the necessary auxiliary ground connections.

Referring now in detail to the drawing, the apparatus of my invention is disposed within a portable carrying case 10 so it may be readily transported to a ground connection the resistance of which it is desired to determine, such as that shown at 11. I also provide auxiliary voltage and current ground connections 12 and 13.

The apparatus contained within the case 10 includes a meter 14, such as a microammeter, a shunt 15, a variable resistor 16 and a current source such as a battery 17 which may conveniently consist of a pair of 7.5 volt C batteries.

Terminals 18, 19 and 20 are brought out on the case 10 and are adapted to be connected by suitable conductors to the ground connections 11, 12 and 13, respectively. A self-opening or push button switch 21 has normally open contacts 22 and 23 while a second push button switch 24 has normally open contacts 25 and 26. The battery 17 is connected to the circuit through a reversing switch 27 and the meter is likewise connected to the circuit through a reversing switch 28. These switches are mechanically connected and may be simultaneously actuated by a lever 27a. Multiplying resistors 29 and 30 are adapted to be connected between the meter 14 and the ground connection 12 by a switch 31.

In using the apparatus described to measure the resistance of the ground connection 11, the auxiliary ground connections 12 and 13 are first provided as by driving portable ground rods. As indicated in Fig. 4, the connection 12 should be at least 40 feet from the connection 11 and the connection 13 at least 20 feet from the connection 12. The several ground connections are then connected to the terminals 18 and 19 as indicated. Fig. 1 illustrates the conditions after the ground connections have been made as described. It will be noted that with conditions as illustrated in Fig. 1, there is no closed circuit connected to the battery and consequently no drain of current therefrom. Any current flow indicated by the meter under these conditions will be stray earth currents or the result of galvanic action.

The next step is to operate switch 24. The closure of contact 25 establishes a series circuit between the ground connections 18 and 20 as follows: from the ground connection 18, through the shunt 15, the variable resistor 16, the battery 17 (switch 27 being closed), the contact 25 of switch 24 and thence to the ground connection 13. This condition is illustrated in Fig. 2. The closure of contact 26 connects the meter 14 across the shunt 15 so that it reads as an ammeter.

The resistor 16 is then adjusted manually while holding the switch 24 closed, to cause a predetermined current to flow through the series circuit just traced. By suitably choosing the shunt 15, a predetermined current, e. g., 15 milliamperes may be caused to flow through the series circuit. The meter 14 is preferably provided with an index or calibration 32 to indicate this current.

When the proper adjustment of the resistor 16 has been made to cause the desired flow of current through the circuit, the switch 24 is released and switch 21 is closed. This condition is illustrated in Fig. 3. The closure of contact 22 of switch 21 maintains the series circuit previously described despite the opening of the contact 25 of switch 24. The closure of the contact 23 short circuits the shunt 15. The meter 14 is then connected across the ground connections 11 and 12 through one or the other of the multiplying resistors 29 and 30, depending on the location of switch 31. The resistance of the shunt 15, of course, is so small that the short circuiting thereof does not appreciably change the current flowing through the series circuit and does not introduce any serious error into the measurement.

The meter 14 is preferably so calibrated that when connected as a voltmeter, a reading in ohms may be obtained directly. This calibration of the meter, of course, will be determined by the various circuit constants. It will be apparent that once the circulating current has been adjusted to the proper value, the operation of the switch 21 provides instantaneously an indication of the actual resistance of the ground connection 11. As soon as the resistance reading has been taken, the switch 21 is released, restoring the apparatus to the condition illustrated in Fig. 1. Since the multiplying resistance connected in the series with the motor 14 when used as a voltmeter is exceedingly high, that portion of the circulating current which is shunted through the meter when reading the voltage drop is so small that it does not materially change the final result.

The effects of polarization or stray currents may be eliminated by reversing the switch 27 and taking the average of successive readings. On the other hand, any resistance reading obtained from galvanic action or earth currents may be deducted from the reading taken when the predetermined current is circulated. Stray alternating currents do not affect the meter 14 which is a direct current instrument. The effect of polarization is minimized since the predetermined current flows for only a relatively short period.

It will be apparent from the foregoing description that the invention is characterized by numerous advantages. A single meter serves both as an ammeter and a voltmeter. Any change in battery voltage resulting from aging or use is compensated by adjusting the current to a predetermined value. The effects of galvanic action may be balanced out and the effect of polarization minimized. The effect of stray earth currents is also canceled.

The direct calibration of the meter in ohms makes it possible to obtain a reading instantaneously. The calibration scale, furthermore, is linear. The apparatus is capable of measuring a wide range of resistances with sufficient accuracy for checking ground rod connections. The apparatus is composed of standard parts and is light in weight and inexpensive in construction. The operation is so simple that the device may be used by an unskilled person. The device also has uses other than as a resistance-measuring apparatus. It may be used, for example, as a general purpose voltmeter or as a continuity meter.

A further advantage is that the battery supplies current only while the resistor 16 is being adjusted for the actual resistance reading being taken. This reduces the drain on the battery and minimizes polarization. The polarity reversing switch 27 makes it possible to cause the voltage due to galvanic action or earth currents to be additive with respect to the voltage drop across the ground connection under measurement. This is accomplished by reversing the polarity of the meter with respect to the ground connections and simultaneously reversing the battery switch to maintain the proper polarity of the meter relative to the battery to insure that the meter pointer will move up-scale and not backward.

When the device is used for measuring resistances generally, the unknown resistance is connected between the terminals 18 and 19, and terminals 19 and 20 are directly connected together. The predetermined circulating current is established and the voltage drop read in ohms, in the same manner as when measuring the resistance of a ground connection.

To use the instrument as a continuity meter, the continuity test-leads are connected to terminals 19 and 20 and the switch 31 is moved to the high-resistance position.

Although I have illustrated and described but a preferred embodiment and practice of the invention, it will be understood that changes in the construction and manipulation may be made without departing from the spirit of the invention or the scope of the appended claim.

I claim:

Apparatus for determining the resistance of a ground connection, comprising a substantially constant-voltage source of current, a current meter, a multiplying resistor connected between said meter and an auxiliary voltage ground connection, a shunt connected in series with said source and said first-mentioned ground connection, a switch having first contact means connected in series circuit with said first-mentioned ground connection, said shunt, said source and an auxiliary current ground connection, to close this circuit when the switch is in closed position, and a second contact means connected to said shunt and said meter to connect them in parallel when the switch is in closed position, whereby the meter indicates the current through the first-mentioned ground connection when said switch is closed, and a second switch having first contact means connected in series circuit with said first-mentioned ground connection, said shunt, said source and said auxiliary current ground connection, to close this circuit when the second switch is closed, said second switch also having a second contact means connected across said shunt to short circuit said shunt when the second switch is closed, whereby said meter indicates the voltage drop across said first-mentioned ground connection when said second switch is closed.

JOHN F. ATKINSON.